Jan. 14, 1958    I. H. McLAREN ET AL    2,819,608
FILTER TESTING
Filed Nov. 27, 1953
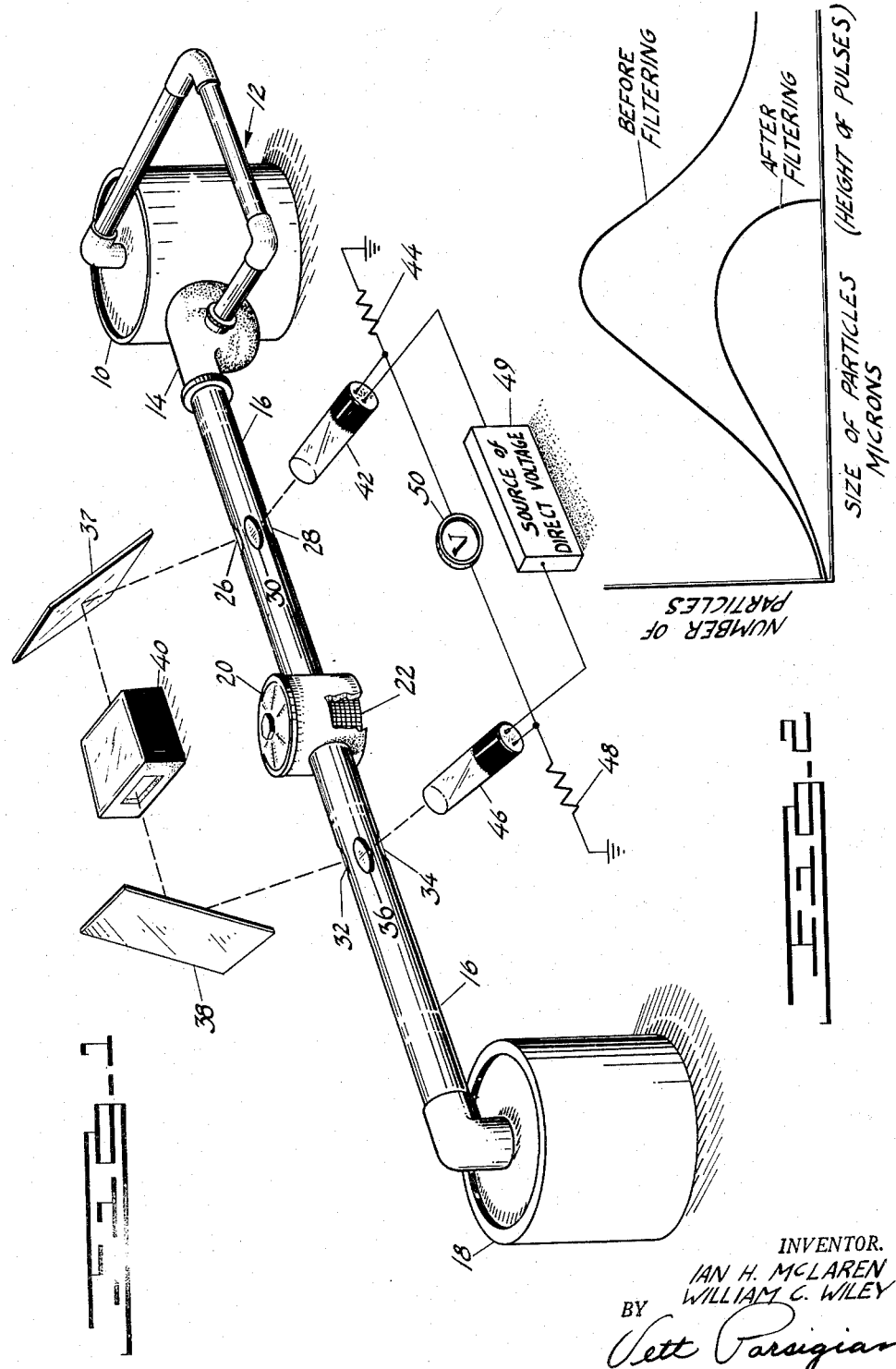
INVENTOR.
IAN H. MCLAREN
WILLIAM C. WILEY
BY
*Vett Parsigian*
ATTORNEY United States Patent Office 2,819,608
Patented Jan. 14, 1958

2,819,608

FILTER TESTING

Ian H. McLaren, Dearborn, and William C. Wiley, Detroit, Mich., assignors to Bendix Aviation Corporation, Detroit, Mich., a corporation of Delaware Application November 27, 1953, Serial No. 394,800

5 Claims. (Cl. 73—38)

This invention relates to apparatus for testing the performance of filters and more particularly to apparatus for determining the efficiency of filters.

The degree to which a filter can remove a contaminant from a fluid is a measure of the efficiency of the filter. A method of determining filter efficiency includes the use of a suitable fluid which contains a standard contaminant such as spherical glass beads having a known size distribution. The fluid is repeatedly passed through a filter over an extended period of time and a determination of the amount of contaminant in the fluid before and after it has been filtered will provide an indication of the effectiveness of the filter.

The amount of contaminant in the fluid can be determined in any one of a number of ways. For example, samples of the fluid before and after filtering may be passed through filter paper to collect all the particles of the contaminant. The filter paper is then burned and the remaining particles of the contaminant are weighed. The relative weights of the contaminant before and after the fluid is filtered is a measure of the efficiency of the filter.

The above disclosed method of determining the efficiency of filters has certain disadvantages. The operations involved are too tedious and slow for testing filters in large quantities. This is true because the fluid must be circulated through the filter for an extended period of time before measurements can be made and also an excessive amount of time is required to determine the weights of the contaminant in samples of the fluid. Another disadvantage is that the measurements obtained are often inaccurate because of the difficulty in obtaining representative samples of the fluid.

This invention provides apparatus which operates to give instantaneous and accurate measurements of the efficiency of filters. A first beam of light is projected through a fluid before it passes a filter and a second beam of light is projected through the fluid after it passes the filter. The ratio of the amount of light scattered in the first and second beams because of the contaminant in the fluid provides an instantaneous indication of the relative densities of the contaminant before and after passing through the filter. A determination of the relative densities of the contaminant will provide an indication of the efficiency of the filter.

An object of this invention is to provide apparatus for testing the performance of a filter.

Another object of this invention is to provide apparatus of the above character for utilizing a light transmitting fluid containing a standard contaminant of known size distribution to determine the efficiency of a filter.

A further object is to provide apparatus of the above character for projecting beams of light through the fluid before and after it passes through a filter and for measuring the amount of light scattered in the beams by the contaminant in the fluid.

Still another object is to provide apparatus of the above character for measuring the efficiency of a filter in a quick and reliable manner.

Other objects and advantages will become apparent from a detailed description of the invention and from the appended drawings and claims.

In the drawings:

Figure 1 is a perspective view of one embodiment of the invention.

Figure 2 is a graph showing the relationship of the number of different sized particles in a fluid before and after the fluid is passed through a filter.

In one embodiment of the invention, a light transmitting fluid such as water is stored in a container 10. Immersed in the water is a standard contaminant having a known size distribution. For example, the contaminant may be a plurality of spherical glass beads which range in size from 10 to 20 microns.

One end of a fluid line 12 is connected to the container 10 and the other end of the line is connected to the inlet of a suitable fluid pump 14. The outlet of the pump 14 is connected to one end of a fluid line 16. The opposite end of the fluid line 16 is connected to a container 18 which is adapted to receive any fluid flowing through the line.

The line 16 is provided with a filter housing 20 at an intermediate position in the line. The housing 20 is adapted to snugly receive a filter 22 for testing purposes. In this way, the filter 22 becomes an integral part of the fluid line 16.

Provided in the line 16 to the right of the housing 20 are a pair of transparent windows 26 and 28. The window 28 is directly beneath the window 26 such that any light passing downward through the window 26 will emerge through the window 28 unless the light is deflected from its straight line path as it passes through the fluid line 16. A window 30 is provided in the line 16 in substantial alignment with the windows 28 and 26 and is disposed at an angular distance of substantially 90° from these windows. Windows 32, 34 and 36 which correspond to windows 26, 28 and 30, respectively, are also provided in the line 16 to the left of housing 20.

A pair of mirrors 37 and 38 are positioned directly above the windows 26 and 32, respectively. The mirrors 37 and 38 are tilted at a suitable angle towards a source of light 40 to direct light beams of substantially equal intensity into the windows 26 and 32, respectively.

A light sensor, such as a phototube 42, is positioned in direct alignment with the window 30. The output of the tube 42 is connected to ground by way of a resistance 44. Similarly a light sensor, such as a phototube 46, is positioned in alignment with the window 36 and the output of the tube is grounded through a resistance 48 having substantially the same value as the resistance 44. Power is supplied to the light sensors 42 and 46 from a source 49 of direct voltage. A voltmeter 50 connected between the resistances 44 and 48 is adapted to provide a reading of the ratio of the voltages that may be developed across the resistances. The voltmeter 50 may be calibrated to provide direct percentage readings of the efficiency of the filter being tested.

When the fluid pump 14 is set in operation, the water in the container 10 is withdrawn through the fluid line 12 and is then introduced from the pump into the fluid line 16. While flowing in the line 16, the water passes through the filter 22 which blocks the passage of a certain portion of the spherical glass beads in the water. After passing through the filter 22, the water and the spherical glass beads remaining therein are received by the container 18.

Before the water is passed through the filter 22, the water travels past the window 26. If there were no contaminant in the water, the light beam projected downward from the mirror 37 into the window 26 would pass directly through the water and emerge from the window 28. The light beam would follow this straight line path because there would be nothing in the water to deflect the light. Since there are a plurality of spherical glass beads in the water, portions of the light beam strike the beads and are scattered in various directions. Some of the scattered light is deflected in the direction of the window 30 and therefore emerges from this window to impinge upon the phototube 42.

The amount of light deflected through the window 30 is dependent upon the density of the contaminant in the water. If there are a large number of spherical glass beads in the water the light beam will strike more of the beads and a larger amount of the light will be deflected through the window 30. Therefore, a determination of the amount of light deflected through the window 30 will provide an indication of the density of the contaminant in the water.

Since the amount of current produced by the photo tube 42 is dependent upon the amount of light impinging upon the tube, the current flow through the resistance 44 and the resultant voltage produced across the resistance are substantially proportional to the intensity of the light deflected through the window 30. Therefore, the magnitude of the voltage produced across the resistance 44 is a measure of the density of the contaminant in the water passing the window 26.

After the water passes through the filter 22, it travels past the window 32. A portion of the light beam from the mirror 38 is deflected through the window 36 in the same manner as a portion of the light beam is deflected through the window 30. The amount of light deflected through the window 36 is dependent upon the density of the contaminant in the water passing the window 32. Depending upon the effectiveness of the filter 22, a particular amount of the contaminant is removed from the water as it passes through the filter. Therefore, the density of the contaminant in the water passing the window 32 is correspondingly less than the density of the contaminant in the water prior to its passage through the filter 22. As a result, the intensity of light deflected through the window 36 is correspondingly less than the intensity of the light deflected through the window 30.

The light emerging from the window 36 will impinge upon the phototube 46 to produce a current flow through the resistance 48 and a voltage across the resistance having a magnitude which is substantially proportional to the intensity of the light passing through the window to provide a measure of the density of the contaminant in the water after it has been filtered.

Since the efficiency of a filter is dependent upon the degree to which the filter can remove a contaminant from a fluid, the efficiency of the filter 22 can be determined by comparing the voltages produced across the resistances 44 and 48. For example, if the voltage across the resistance 44 is 10 and the voltage across the resistance 48 is 3, this indicates that the density of the contaminant has been reduced from 10 units to 3 units upon passage of the water through the filter 22. Since the density of the contaminant has been reduced to 30% of its initial value, the filter 22 has an efficiency of 70%. This means that each time the water is passed through the filter, substantially 70% of the particles in the water will be removed. The voltmeter 50 is adapted to compare the voltages across the resistances 44 and 48 and may be calibrated to provide direct readings of the efficiency of the filter being tested.

In this way, continuous and automatic measurements of the efficiency of the filter can be provided by comparing the density of the contaminant before and after the water is passed through the filter. The above disclosed method for determining the efficiency of filters has several advantages over the methods now in use. Since the efficiency of the filter can be determined with one pass of the fluid through the filter, the amount of time required to make measurements is very short and the efficiency of large quantities of filters can be quickly determined. The measurements obtained are highly accurate because the density of the contaminant before and after filtering is continuously measured and an average reading is provided on the voltmeter. Furthermore, there is no need to obtain representative samples of the fluid or to control the amount of contaminant which may be immersed in the fluid as is required in present methods for determining the efficiency of filters.

The apparatus disclosed has another advantage in that efficiency readings taken over a period of time will provide a curve showing the decrease in the efficiency of the filter with respect to time. By extending such a curve the filter life in hours can be determined without having to test the filter for the full period of its life.

By a slight modification of the apparatus disclosed above, it is also possible to obtain complete curves of the size distribution of the particles of the contaminant before and after the fluid is filtered. This can be accomplished by using a relatively small amount of contaminant in the fluid so that individual particles of the contaminant will pass the windows 26 and 32 one at a time. In this way the number of particles in the fluid can be determined by counting the number of pulses produced in a light sensor as a result of the light deflected by the particles.

Since the amount of light deflected by each particle is a function of its size, the magnitude of the current pulses produced by a light sensor can be correlated with actual bead sizes. If a multi-channel pulse height discriminator is used in conjunction with the light sensor, the number of pulses of different heights can be counted and recorded to provide an indication of the number of different size particles in the fluid before and after the fluid is filtered. Curves plotted with such information will show the number of particles of any given size in the fluid before and after filtering as illustrated in Figure 2. Such curves are very useful in research work to determine the efficiency of filters for different sized particles.

Although this invention has been disclosed and illustrated with reference to particular applications, the principles involved are susceptible of numerous other applications which will be apparent to persons skilled in the art. The invention is therefore, to be limited only as indicated by the scope of the appended claims.

What is claimed is:

1. Apparatus for determining the performance characteristics of a filter, including, a fluid circuit, means for receiving a filter in the circuit, means for providing in the circuit a flow of fluid containing a contaminant capable of deflecting light beams, means for directing a first beam of light through the fluid before the movement of the fluid through a filter disposed in the filter receiving means to deflect a particular amount of the light depending upon the density of the contaminant in the fluid, means for directing a second beam of light through the fluid after the movement of the fluid through the filter to deflect a particular amount of the light depending upon the density of the contaminant in the fluid, and means for detecting the amount of light deflected in the first and second beams to provide indications of the density of the contaminant before and after the fluid is passed through the filter.

2. Apparatus for determining the performance characteristics of a filter, including, a line for the passage of fluid, means for receiving a filter at an intermediate position in the line, means for pumping through the line a given amount of fluid containing a contaminant capable of scattering light beams, means for passing a first beam of light through the fluid before the movement of the fluid through a filter disposed in the filter receiving means, means for passing a second beam of light through the fluid after the movement of the fluid through the filter, and means for detecting the amount of light scattered in the first and second beams by the contaminant in the fluid to provide an indication of the ratio of the density of the contaminant in the fluid before and after the fluid is filtered.

3. Apparatus for determining the performance characteristics of a filter, including, a fluid line, a means positioned in the line for receiving a filter, means for producing a flow of a light-transmitting fluid through the line, a plurality of particles of a contaminant immersed in the fluid, the contaminant being capable of deflecting light beams, means for directing a first beam of light into the fluid before the movement of the fluid through a filter disposed in the filter receiving means, means for directing a second beam of light into the fluid after the movement of the fluid through the filter, and means for measuring the intensities of the light deflected in the first and second beams to provide an indication of the ratio of the density of the contaminant in the fluid before and after the fluid is filtered.

4. Apparatus for determining the performance characteristics of a filter, including, a fluid having light-transmitting properties, a plurality of particles of a standard contaminant immersed in the fluid, the contaminant being capable of deflecting light beams, a fluid line, means positioned in the fluid line for receiving a filter, means for producing a flow of the contaminated fluid through the line, means for directing a first beam of light into the fluid before the movement of the fluid through a filter disposed in the filter receiving means to produce a deflection of the beam in accordance with the number of particles of the contaminant in the path of the beam, means for directing a second beam of light into the fluid after the movement of the fluid through the filter to produce a deflection of the beam in accordance with the number of particles of the contaminant in the path of the beam, first and second photo tubes for measuring the amount of light deflected in the first and second beams, and an indicator for comparing the amount of light deflected in the first and second beams to provide an instantaneous indication of the effectiveness of the filter.

5. Apparatus for determining the performance characteristics of a filter, including, a fluid line, means for disposing a filter in the line for filtering any fluid flowing through the line, a fluid having light-transmitting properties, a plurality of particles of a contaminant in the fluid, the contaminant being capable of scattering light beams, means for introducing the fluid into the fluid line and for producing a flow of the fluid through the line, means for projecting a first beam of light into the fluid before the movement of the fluid through a filter placed in the filter disposing means and in a direction substantially perpendicular to the direction of fluid flow to produce a scattering of the first beam in accordance with the number and size of the particles, means for projecting a second beam of light into the fluid after the movement of the fluid through the filter and in a direction substantially perpendicular to the direction of fluid flow to produce a scattering of the second beam in accordance with the number and size of the particles, and means for determining the amount of light scattered in a particular direction in the first and second beams to provide an indication of the density of the contaminant in the fluid before and after the fluid is filtered.

References Cited in the file of this patent

UNITED STATES PATENTS

| | | |
|---|---|---|
| 2,019,871 | Pettingill et al. | Nov. 5, 1935 |
| 2,072,872 | Finkelstein | Mar. 9, 1937 |
| 2,638,688 | Hazelton | May 19, 1953 |

OTHER REFERENCES

Publications:

(1) Coolidge et al., "Photoelectric Measurement of Dust" Instruments, May 1951, pp. 534, 544, 578, and 580.

(2) "Dill Dust Spot Tester," Research Appliance Co., Pittsburgh, Pa., 4 pages.

Publication, article entitled "Testing Oil Filter Efficiency," Automotive Industries, April 2, 1938, pp. 484, 485.